UNITED STATES PATENT OFFICE.

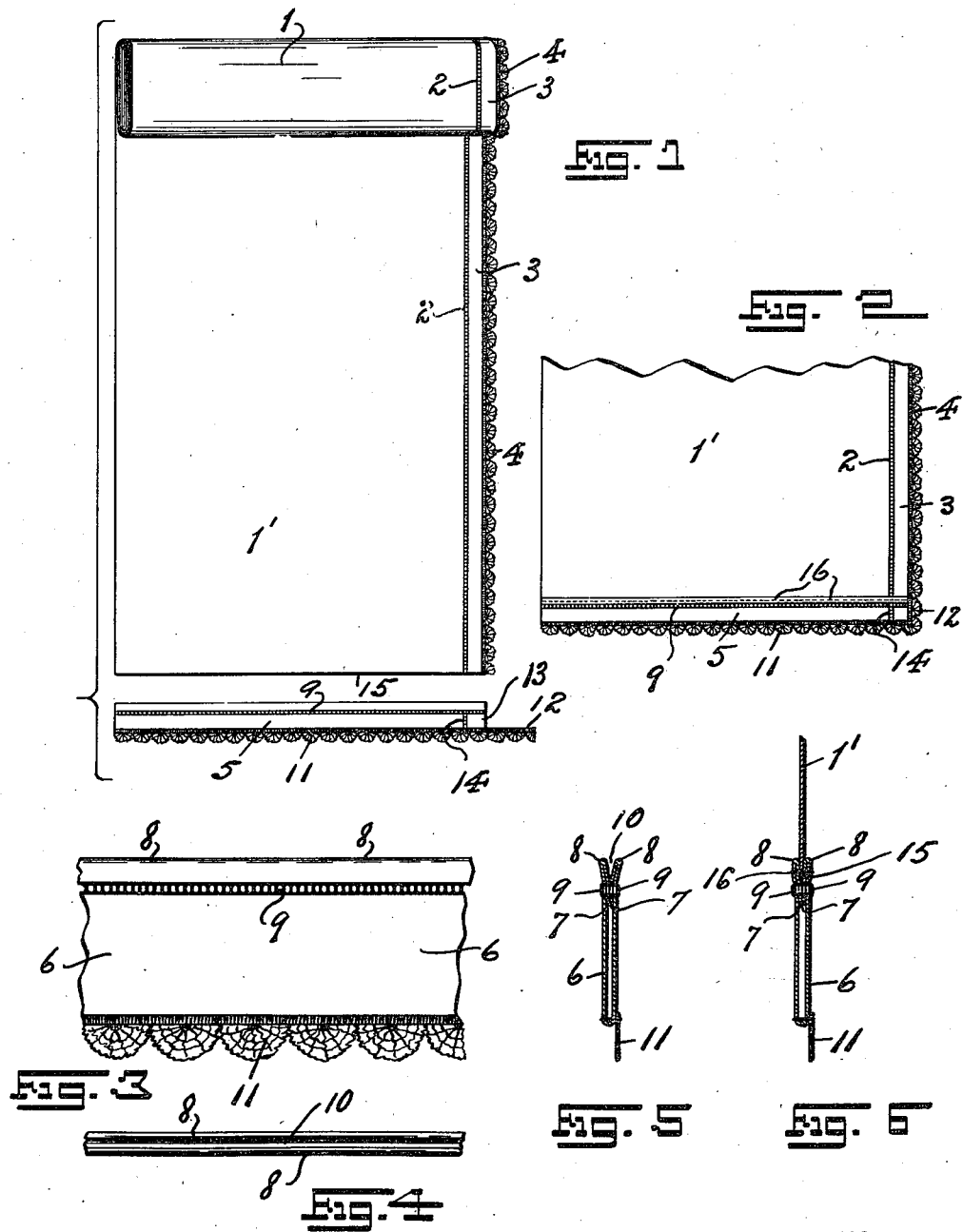

FRANK B. BURNS, OF NEW YORK, AND CHARLES A. BURNS, OF MOUNT VERNON, NEW YORK; SAID CHARLES A. BURNS ASSIGNOR TO SAID FRANK B. BURNS.

EDGING FOR CURTAINS.

1,173,927.

Specification of Letters Patent.

Patented Feb. 29, 1916.

Application filed May 26, 1915. Serial No. 30,557.

*To all whom it may concern:*

Be it known that we, FRANK B. BURNS, a citizen of the United States, residing at New York, county of New York, and State of New York, and CHARLES A. BURNS, a citizen of the United States, residing at Mount Vernon, in the county of Westchester and State of New York, have invented certain new and useful Improvements in Edging for Curtains; and we do hereby declare the following to be a full, clear, and exact description of the invention, such as will enable others skilled in the art to which it appertains to make and use the same, reference being had to the accompanying drawings, and to characters of reference marked thereon, which form a part of this specification.

The present invention relates, generally, to improvements in detached bottom edgings or hems for curtain material, such as is used in making up fabric curtains for doors, windows and similar places; and, the invention has reference, more particularly, to a novel construction of detached bottom edging or hem, adapted to be sold with and then attached to a desired length of curtain material cut from pieces of yard goods, so that the bottom edge or hem of such length of curtain material may be made to conform to the side edge or hem of the material by attaching thereto said novel construction of detached edging or hem; and to this end the principal object of the present invention is to provide a novel construction of detached bottom edging or hem, having novel means for connecting the same with a length of curtain material to complete and provide a finished curtain ready to hang.

Heretofore manufacturers of fabric curtains have completed or finished the curtain with the desired edging or hem at the sides and bottom, and this practice necessitated the making up of said curtains in stock sizes or lengths, and if the window or other place to which such curtains were to be applied happened to be an odd or unusual size, the housewife was compelled to have the curtains therefor made to order, since stock sizes sold by the manufacturer and procurable through the trade would not fit, or would be for other reasons undesirable.

It is the object of our present invention to provide means for avoiding this situation, and to this end the trade is provided with curtain material, having a completed side edge or hem, in rolls or bolts known as yard goods, and from which any length of piece to produce any desired length of curtain may be cut by the shop-keeper and sold to the housewife. In order to provide means for finishing the raw or cut edge of the length of curtain material cut from the yard goods, so that said bottom edge conforms in appearance to the side edging or hem we have devised the novel detached bottom edging or hem which is the subject matter of our present invention. This novel attached bottom edging or hem is provided to the trade in conjunction with the yard goods, and permits the trade to sell its customers, with a desired length of curtain material, a proper length of bottom edging or hem for attachment thereto. We prefer to make the novel detached bottom edging or hem in lengths equal to twice the width of curtain material with which it is sold, so that by cutting the novel detached edging or hem in half enough thereof is provided to finish the bottom edge of two, or in other words, a pair of curtains.

Other objects of our present invention not at this time more particularly enumerated will be clearly understood from the following detailed description of the same.

With the various objects of the present invention in view, the same consists, primarily, in the novel detached bottom edging or hem hereinafter set forth; and, the invention consists, furthermore in the several novel arrangements and combinations of the parts thereof, as well as in the details of the construction of the same, all of which will be more fully described in the following specification, and then finally embodied in the claims which are appended to and which form an essential part of this specification.

The said invention is clearly illustrated in the accompanying drawings, in which:—

Figure 1 is a plan view of a piece of yard goods in the form of curtain material from which a desired length of curtain may be cut, and shown in conjunction therewith but detached therefrom is a piece of the novel detached bottom edging or hem made according to and embodying the principles of the present invention. Fig. 2 is a plan view of the lower end of a piece of said curtain material showing the novel detached bottom edging or hem attached thereto to finish the bottom edge of said material and conform the same to the side edge or hem thereof. Fig. 3 is an enlarged detail face view of a portion of said novel detached bottom edging or hem. Fig. 4 is a top edge view of the same. Fig. 5 is a transverse section through the same; and Fig. 6 is a similar transverse section of the same and a portion of curtain material to which it has been attached and secured to finish the bottom edge of the latter.

Similar characters of reference are employed in all of the hereinabove described views, to indicate corresponding parts.

Referring now to the said drawings, the reference-character 1 indicates a roll or bolt of yard goods 1' in the form of fabric curtain material, a side edge of which is hemstitched, as at 2, to provide the hem 3, which may be further ornamented with the lace-edging 4. This roll or bolt of curtain material provides a quantity thereof from which may be cut off any desired length of piece to furnish the exact length of curtain desired by a purchaser.

The reference character 5 indicates a strip of our novel construction of detached bottom edging or hem, which is made according to and embodies the principles of our present invention, and which is sold by the tradesman with desired lengths of curtain material cut from the roll or bolt 1 thereof, for the purpose of providing means for finishing the cut bottom end thereof, and conforming the same, as to the hem and ornamental edging, to the side edge of said curtain material. The said novel strip of detached bottom edging or hem 5 comprises a strip of material conforming in quality and kind to the material forming the length of curtain cut from the roll or bolt 1. This strip of material is doubled upon itself to provide a hem-portion 6. The free edges 7 of said strip of material are registered together, and then folded or tucked inwardly between the side portions of the doubled hem-portion 6, thus providing a double upper edge portion 8. The strip of material as thus formed is then fed to and stitched upon a hem-stitching sewing machine, to hem-stitch together the side of said hem-portion 6 and the inwardly folded or tucked free edges 7 thereof, the hem-stitches 9 thus formed being spaced marginally back from the outer end of said double upper edge portion 8, thus providing between the members of said double edge portion 8 a longitudinally extending intervening open pocket or receiving-space 10. When so desired the lower edge of said hem-portion 6 may be ornamented with a lace-edging 11 stitched or sewn thereto, the same conforming in kind and quality to the lace-edging 4 of the main portion of said curtain material. When such lace-edging 11 is applied it is made a little longer than the length of the strip of bottom edging or hem 5, so that a projecting end or tail 12 thereby is provided, which when the strip of bottom edging or hem 5 is applied and secured to the bottom edge of the curtain material cut from the roll or bolt 1, this said end or tail 12 may be turned around and secured to the outer end 13 of said strip of bottom edging or hem 5, and joined end to end with the lace-edging 4 of said side edge or hem of said curtain material, thus finishing the lower outer corner of the curtain. The outer end 13 of said strip of bottom edging or hem 5 is also provided with a line of vertically disposed hem-stitches 14, to aline with and extend from the hem-stitches 2 of the curtain material cut from the roll or bolt 1, when said bottom edging or hem 5 is applied thereto.

The housewife may thus buy from yard goods in the form of curtain material contained in the roll or bolt 1, any desired length of piece which will conform to her needs as to length of finished curtain wanted, and with such piece or pieces of curtain material the tradesman will furnish a required length of detached bottom edging or hem 5. In applying said detached bottom edging or hem 5 to the cut bottom end of such curtain material, the housewife will insert the cut bottom end 15 of the curtain material into the intervening open pocket or receiving space 10 of the hem-portion 6 between the members of the double edge 8, which will then straddle and conceal said cut end 15, and then sew the members of said double edge 8 to said cut end 15 by ordinary sewing stitches 16 made by hand or a sewing machine, thus attaching said strip of edging or hem 5 to the cut bottom end 15 of the curtain material, which will thereupon have the same appearance and finish as the side edge or hem of the curtain material, the end or tail 12 of the lace-edging 11 of said strip of edging or hem 5, being turned around the end of the latter and joined end to end with the lace-edging 4 of the curtain material to finish the corner of the curtain, and complete the attachment of said strip of edging or hem 5 thereto.

Of course where the curtain material is provided with a plain hem at the side, the lace-edging 4 being omitted, the strip of edging or hem 5 may also be provided without the corresponding lace-edging 11.

It will be noted that by providing the strip of edging or hem 5 with the novel double edge 8 providing the intervening pocket or receiving space 10, the bottom cut edge 15 of the curtain material is concealed on both sides of the finished curtain, so that the sides or faces of the finished curtain are alike, and furthermore left and right hand curtains can be made with the same strip of edging or hem 5. And a still further advantage of such construction lies in the strength of attachment assured, and in so covering the rough cut edge 15 of the curtain material that raveling or fraying of the cut bottom edge 15 is entirely prevented.

We are aware that some changes may be made in the construction and arrangement of the parts providing our novel detached bottom edging or hem 5 without departing from the scope of our present invention. Hence, we do not confine ourselves to the exact arrangements and combinations of the device and its parts as described in the said specification, nor do we limit ourselves to the exact details of the construction of the same as illustrated in the accompanying drawings, except as required by the scope of the claims appended hereto.

We claim:—

1. A detached edging or hem for curtain material comprising a strip of material doubled upon itself longitudinally to provide a hem-portion, the free upper edges of said strip of material being folded inwardly and tucked between the sides of said hem-portion, and longitudinally extending hem-stitches passing through the sides of said hem-portion and said inwardly folded and tucked upper edges, said hem-stitches being spaced marginally from the outer extremities of said folded and tucked upper edges to provide an intervening longitudinally extending pocket or receiving space between the latter, substantially as and for the purposes specified.

2. A detached edging or hem for curtain material comprising a strip of material doubled upon itself longitudinally to provide a hem-portion, the free upper edges of said strip of material being folded inwardly and tucked between the sides of said hem-portion, and longitudinally extending hem-stitches passing through the sides of said hem-portion and said inwardly folded and tucked upper edges, said hem-stitches being spaced marginally from the outer extremities of said folded and tucked upper edges to provide an intervening longitudinally extending pocket or receiving space between the latter, and an ornamental lace-edging secured to the lower edge of said hem-portion, substantially as and for the purposes described.

3. A detached bottom edging or hem for curtain material comprising a strip of material doubled upon itself longitudinally to provide a hem-portion, the free upper edges of said strip of material being folded inwardly and tucked between the sides of said hem-portion, and longitudinally extending hem-stitches passing through the sides of said hem-portion and said inwardly folded and tucked upper edges, said hem-stitches being spaced marginally from the outer extremities of said folded and tucked upper edges to provide an intervening longitudinally extending pocket or receiving space between the latter, and an ornamental lace-edging secured to the lower edge of said hem-portion, said lace-edging having a free end or tail projecting beyond one end of said hem-portion so that the same may be turned around and secured to said end of said hem-portion, substantially as and for the purposes set forth.

4. A detached bottom edging or hem for curtain material comprising a strip of material doubled upon itself longitudinally to provide a hem-portion, the free upper edges of said strip of material being folded inwardly and tucked between the sides of said hem-portion to provide a double edge forming an intervening pocket or receiving space therebetween, a line of longitudinally extending hem-stitches passing through the sides of said hem-portion and the inner ends of said inwardly folded and tucked upper edges, and a vertical line of hem-stitches passing through said hem-portion adjacent to one end thereof, substantially as and for the purposes described.

5. A detached bottom edging or hem for curtain material comprising a strip of material doubled upon itself longitudinally to provide a hem-portion, the free upper edges of said strip of material being folded inwardly and tucked between the sides of said hem-portion to provide a double edge forming an intervening pocket or receiving space therebetween, a line of longitudinally extending hem-stitches passing through the sides of said hem-portion and the inner ends of said inwardly folded and tucked upper edges, a vertical line of hem-stitches passing through said hem-portion adjacent to one end thereof, and an ornamental lace-edging secured to the lower edge of said hem-portion, said lace-edging having a free end or tail projecting beyond one end of said hem-portion so that the same may be turned around and secured to said end of said hem-portion, substantially as and for the purposes set forth.

In testimony, that we claim the invention set forth above we have hereunto set our hands this 20th day of May, 1915.

FRANK B. BURNS,
CHARLES A. BURNS.

Witnesses:
J. W. BULL,
GEO. W. LIVERMORE.